(12) United States Patent
Nakamura

(10) Patent No.: US 6,644,805 B2
(45) Date of Patent: Nov. 11, 2003

(54) CLAMPING MECHANISM OF SPECTACLE LENS

(75) Inventor: Eio Nakamura, Sabae (JP)

(73) Assignee: Real Vision Co., Ltd., Sabae (JP)

( * ) Notice: Subject to any disclaimer, the term of this patent is extended or adjusted under 35 U.S.C. 154(b) by 0 days.

(21) Appl. No.: 10/151,939

(22) Filed: May 22, 2002

(65) Prior Publication Data

US 2002/0191149 A1 Dec. 19, 2002

(30) Foreign Application Priority Data

Jun. 18, 2001 (JP) .................................... 2001-183785
May 14, 2002 (JP) .................................... 2002-138251

(51) Int. Cl.⁷ ............................................... G02C 1/04
(52) U.S. Cl. ..................... 351/103; 351/108; 351/109
(58) Field of Search .......................... 351/44, 103–106, 351/108, 109

(56) References Cited

U.S. PATENT DOCUMENTS 5,379,464 A * 1/1995 Schleger et al. ............... 2/431
5,796,460 A * 8/1998 Maturaporn ................. 351/86
6,193,367 B1 * 2/2001 Lee ............................. 351/86
6,345,892 B2 * 2/2002 Nakamura ................. 351/103

* cited by examiner

Primary Examiner—Huy Mai
(74) Attorney, Agent, or Firm—Snider & Associates; Ronald R. Snider

(57) ABSTRACT

Clamping mechanism of spectacle lens is provided, which does not involve any complications in assembly, but allows the spectacle lens to be held in place with facility and renders the spectacles smart and shapely in design. A pair of glasses or a lens is stably and accurately supported in front of the eyes by poking the projections provided to either the front bar or the rim frame to support the same through at least two points of the same for clamping. The facility of clamping the lens or lenses allows the labor for the assembly of the spectacles to be lightened as well as the production cost thereof to be reduced, which facility also renders the spectacles as assembled smart and shapely in design, so that its industrial applicability is very high.

17 Claims, 4 Drawing Sheets

CLAMPING MECHANISM OF SPECTACLE LENS

RELATED APPLICATION

This application claims the priority of Japanese Patent Application No.2001-183785 filed on Jun. 18, 2001 and that of Japanese Patent Application No.2002-138251 filed on May 14, 2002, which applications are incorporated herein by reference.

BACKGROUND OF THE INVENTION

1. Technical Field

The present invention relates to an improvement of the spectacles, in more details, pertaining to a clamping mechanism of the spectacle lens, which lens can be readily clamped with an extremely streamlined structure so as to render the spectacles shapely in design.

2. Prior Art

Conventionally, the clamping of the spectacle lens is carried out by supporting the same lens with a rimmed or semi-rimmed frame or without such frame at all.

In the case of the rimmed frame, it is often that the lenses are locked to the rims with small screws, which screws shall be turned for both the attachment and detachment of the lenses so as to require skill and labor on the part of the assemblers.

In the case of the semi-rimmed frame, in order to clamp the lenses to the frame, the lower half rim portion of the respective lenses shall be hung to a band, which requires a lot of labor on the part of the assemblers and causes an inconvenience where the lenses can not be held in place once the band is cut off in use.

Further, in the case of the frame having no rims to surround the lenses, the spectacles having such frame comprises a bridge to interpose between the right-and-left lenses and the respective temples hinged through an end member to the respective sides of a front consisting of a pair of lenses that are held in juxtaposition by the bridge wherein the engagement between the lenses and the bridge as well as the end members is achieved by boring the clamping holes in the lenses, through which holes the lenses and the bridge as well as the end members are connected with bolts and nuts, which complicates the frame structure. Thus, it often occurs that the lens edge portions break owing to the external force as applied to the temples, for example.

DISCLOSURE OF THE INVENTION

In view of the above inconvenience encountered with the conventional spectacles, the present invention is to provide a clamping mechanism of spectacle lens that allows the respective lenses to be clamped with an extremely streamlined and shapely structure.

To begin with, in order to solve the above issue, the present invention as characterized in that a spectacle front F comprises a pair of lenses 1 and 1 and a transversely extending front bar 2 to support the respective lenses 1 and 1 in front of the respective eyes wherein clamping holes 11 and 11 are bored through the respective lenses 1 and 1 at an upper rim portion thereof and projections 21 and 21 are provided on the front bar 2 to support the respective lenses 1 and 1 in front of the respective eyes so as to poke the projections 21 and 21 through the clamping holes 11 and 11 of the respective lenses 1 and 1.

Secondly, the present invention is characterized in that a spectacle front F comprises a transverse lens 1a wide enough to cover the respective eyes and a rim frame 2a to support a roar side of the lens 1a wherein clamping holes 11a and 11a are bored through the lens 1a in the vicinity of its respective sides while projections 21a and 21a are provided on the rim frame 2a, which projections 21a and 21a correspond to the clamping holes 11a and 11a so as to poke the projections 21a and 21a through the clamping holes 11a and 11a.

In addition to the above means, the provision of the relative difference in curvature between the lens 1 and the front bar 2 is effective for elastically clamping the upper rim of the lens to the front bar in accordance with the curvature thereof. In addition to the above means, it is also effective that attachment holes 22 are bored through the front bar 2, into which holes fixing elements 23 are fitted so as to form the projections 21. Further, in addition to the above means, it is also effective that the head portion of the projection 21 is covered with a synthetic resin coat 21a and that the head portion thereof is provided with a stopper 21b.

BEST MODE FOR CARRYING OUT THE INVENTION

Hereinafter, the best mode for carrying out the invention is described with reference to the accompanying drawings.

(First Embodiment)

Figure 1:
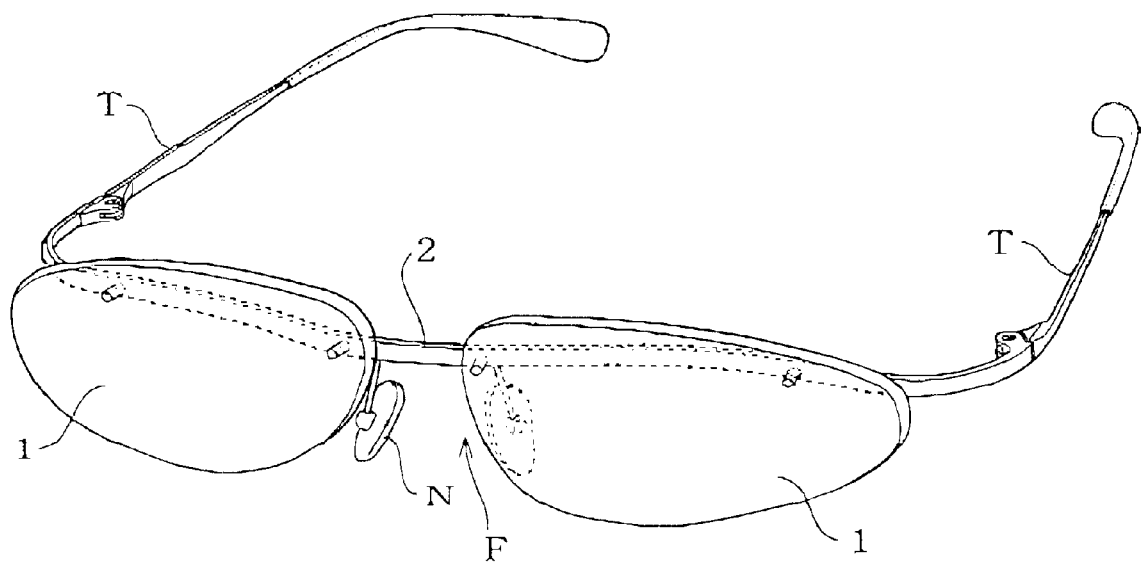
FIG. 1 is the whole perspective view of a pair of spectacles of the first embodiment of the present invention.
Figure 2:
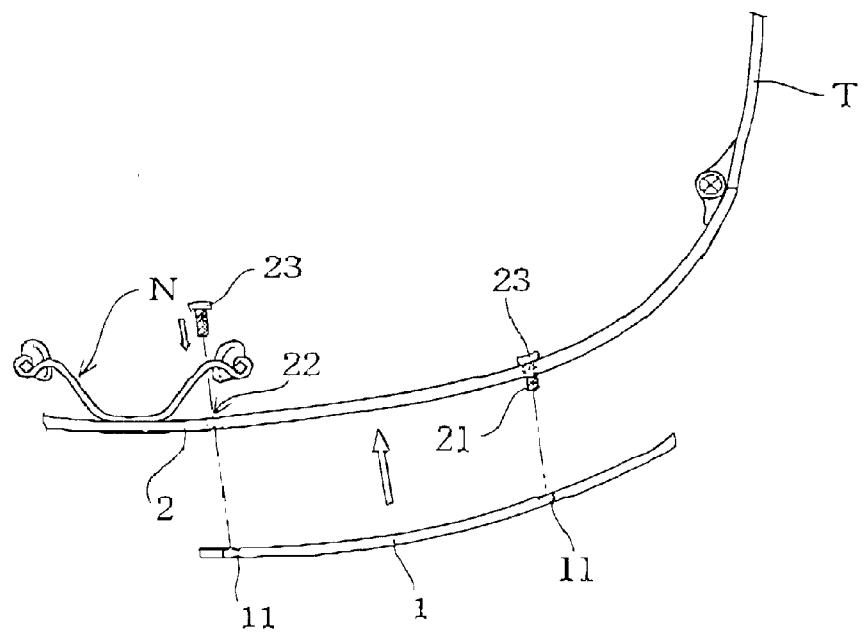
FIG. 2 is a partly upper view of the spectacles to show the structure thereof according to the first embodiment of the present invention.
Figure 3:
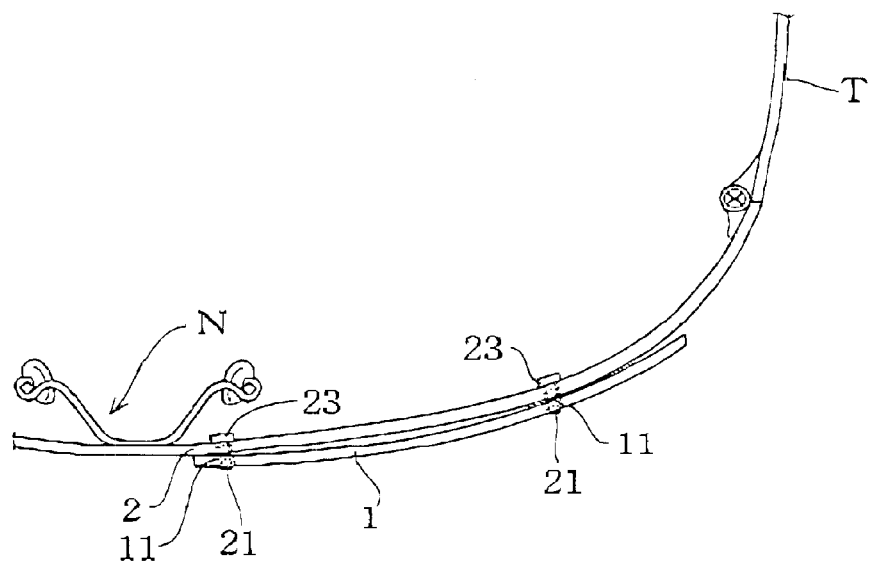
FIG. 3 is a partly upper view of the spectacles to show the clamping condition thereof according to the first embodiment of the present invention.

The present embodiment of 'clamping mechanism of spectacle lens' according to the present invention is described below with reference to FIGS. 1 to 3, in which reference numeral 1 indicates a lens, in the vicinity of which respective upper rims clamping holes 11 and 11 are provided and reference numeral 2 indicates a front bar, which bar is arranged such that it extends along both eyebrows and is here made from a metallic thin plate light in weight and rich in elasticity such as β-titanium and super elastic alloy essentially consisting of Ni—Ti compounds.

Upon the assembly of the spectacles according to this embodiment, in order to dispose the respective lenses 1 and 1 against the respective eyes, the projections 21 and 21 are provided on the front bar 2 such that those projections are opposed to the clamping holes 11 and 11 of the respective lenses 1 and 1.

Upon the formation of the projections 21 and 21 according to the present embodiment, attachment holes 22 are bored through the front bar 2, into which holes fixing elements 23 are fitted so that the same projections protrude from the frontal side of the bar. A screw or a rivet is adoptable for this fixing element 23, but a screw is exemplified in this embodiment, which screw is driven from the ocular side of the respective lenses so as to protrude and form the projection.

Then, either one of the respective lenses 1 and 1 or the front bar 2 is bent so as to align the interval between the respective clamping holes 11 and 11 with that between the respective projections 21 and 21, in which condition the respective clamping holes 11 and 11 are engaged to the respective projections 21 and 21.

In this embodiment, the provision of the relative difference in curvature between the respective lenses 1 and 1 and the front bar 2 allows the upper rim of the respective lenses to flexibly bend in accordance with the curving surface off the front bar. Then, as shown in FIG. 3, the respective lenses 1 and 1 are clamped to the front bar 2 by poking the projections 21 of the front bar 2 through the clamping holes 11.

(Second Embodiment)

Figure 4:
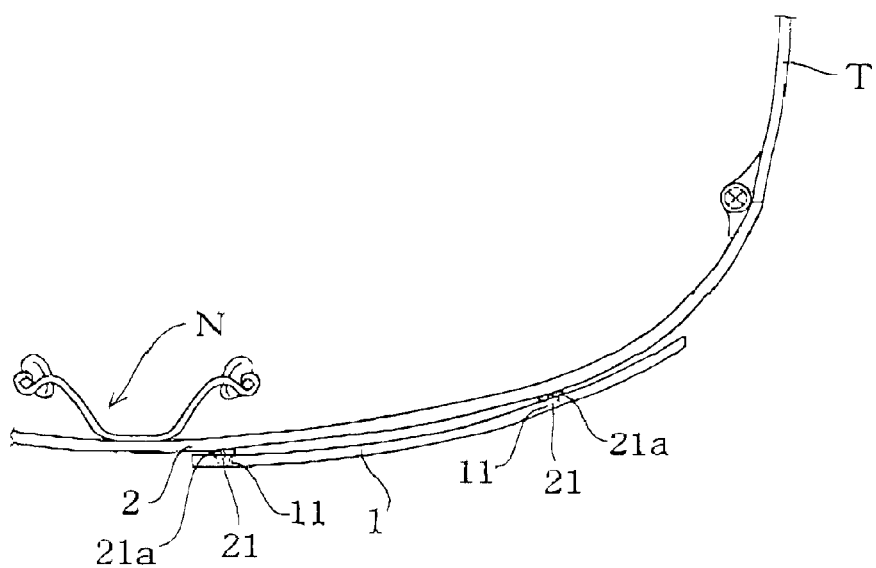
FIG. 4 is a partly upper view of the spectacles to show the clamping condition thereof according to the second embodiment of the present invention.

Then, the present embodiment of 'clamping mechanism of spectacle lens' according to the present invention is described below with reference to FIG. 4.

In this embodiment, the projections 21 are integrally formed together with the front bar 2. Further, the head portion of the projection 21 is covered with a synthetic resin coat 21*a*. The clamping of the projection 21 through this coating to the clamping hole allows the frictional resistance of the projection against the clamping hole to increase so as to prevent the former from slipping off the latter and allows the dynamic load carried on the edge portion of the clamping hole to abate so as to prevent the lenses from breaking. The other structural elements of this embodiment are the same as those of the first embodiment.

(Third Embodiment)

Figure 5:
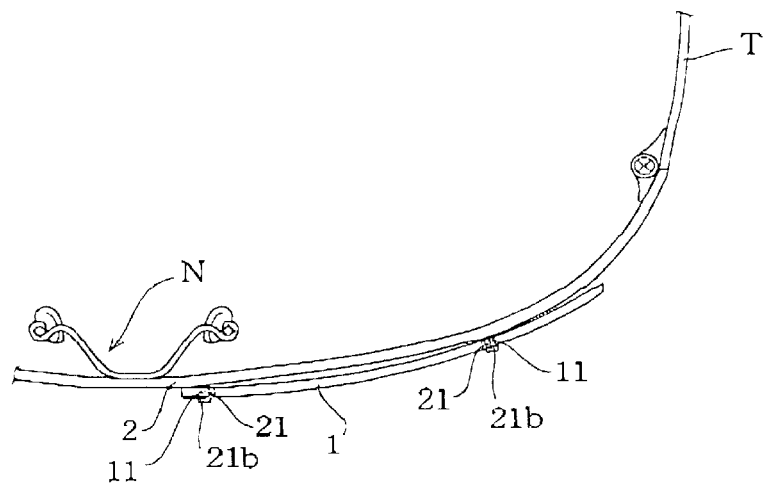
FIG. 5 is a partly upper view of the spectacles to show the clamping condition thereof according to the third embodiment of the present invention.

The present embodiment of 'clamping mechanism of spectacle lens' according to the present invention is described below with reference to FIG. 5. This embodiment is characterized in that the projection 21 of the front bar 2 is provided with a stopper 21*b* at the head portion thereof. Those stoppers are provided such that they face away from each other, which stoppers act on the elastic recovery direction of the respective lenses so as to block the lenses from slipping off the clamping holes 11. The other structural elements of thin embodiment are the care as those of the first embodiment.

(Fourth Embodiment)

The present embodiment of 'clamping mechanism of spectacle lens' according to the present invention is described below with reference to FIG. 6, in which reference numeral 1*a* indicates a transverse lens, which lens is wide enough to cover the respective eyes of a wearer and a portion of which lens opposed to the nose ridge is narrowly formed. The respective sides of the lens 1*a* arcuately bend rearwards interposing such narrow portion. A clamping hole 11*a* is provided through the respective sides of this lens 1*a*.

Figure 6:
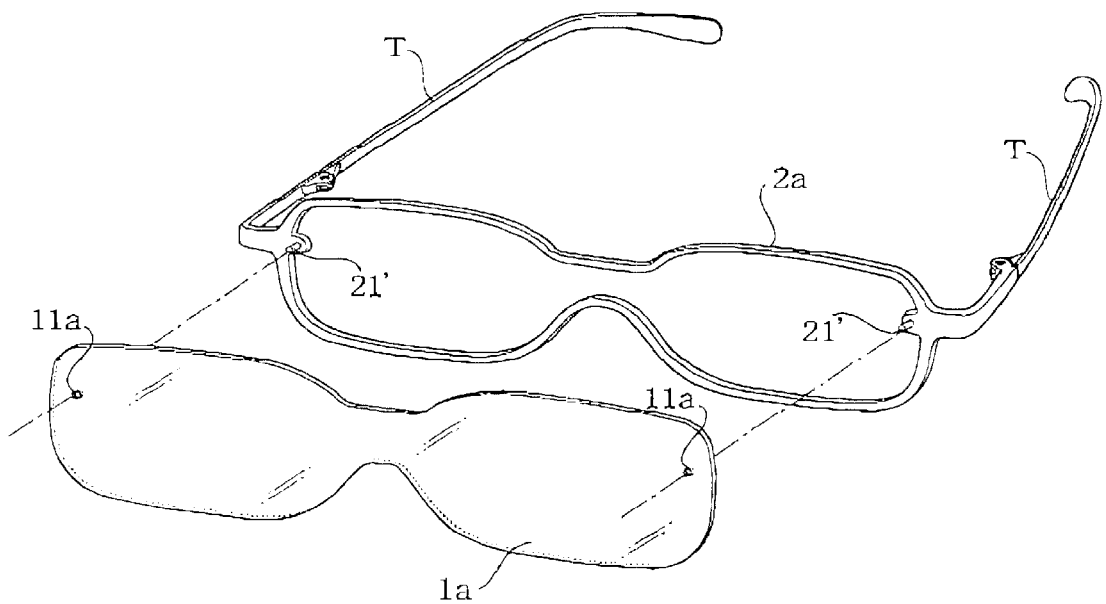
FIG. 6 is a broken perspective view of the spectacle front according to the fourth embodiment of the present invention.

On the other hand, in FIG. 6, reference numeral 2*a* indicates a transversely long rim frame made from β-titanium, which frame has a shape in conformity with the contour of the lens 1*a* so as to support the whole circumference of the rear side thereof. A projection 21*a* is provided at the respective sides of the rim frame 2*a*, which projection corresponds to the clamping hole 11*a* provided at the respective sides of the lens 1*a*. The clamping of the projections 21*a* and 21*a* to the corresponding clamping holes 11*a* and 11*a* of the lens 1*a* allows the rear side surface of the same to be supported on the rim frame 2*a*.

The present invention is substantially arranged as described above, but it is not limited to the above embodiments as shown in the accompanying drawings. It can be modified into various manners within the scope of the accompanying patent claims. For instance, upon the clamping or the lenses to the front bar, the lenses are not necessarily flexible. Instead, the projections of a flexible front bar may be engaged to the clamping holes of the respective lenses. In addition to the above modifications, the material for the front bar 2 and the rim frame 2*a* is not limited to the afore-mentioned metal, but may be of synthetic resin material, provided that it satisfies a given strength and elasticity as required therefor.

Figure 7:
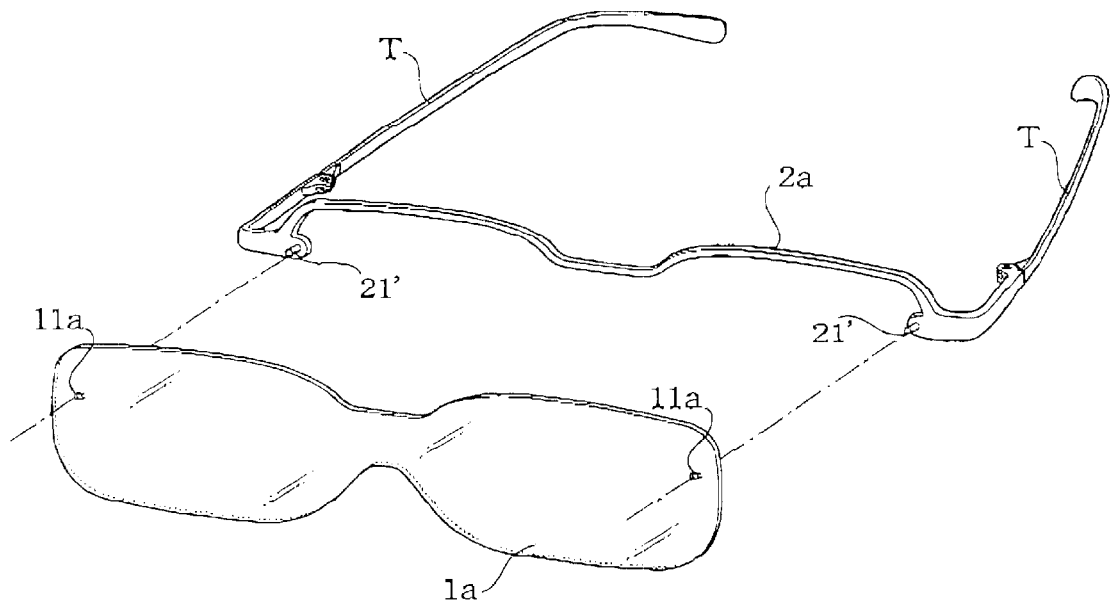
FIGS. 7 and 8 are broken perspective views of modified examples of the spectacle front according to the fourth embodiment of the present invention.
Figure 8:
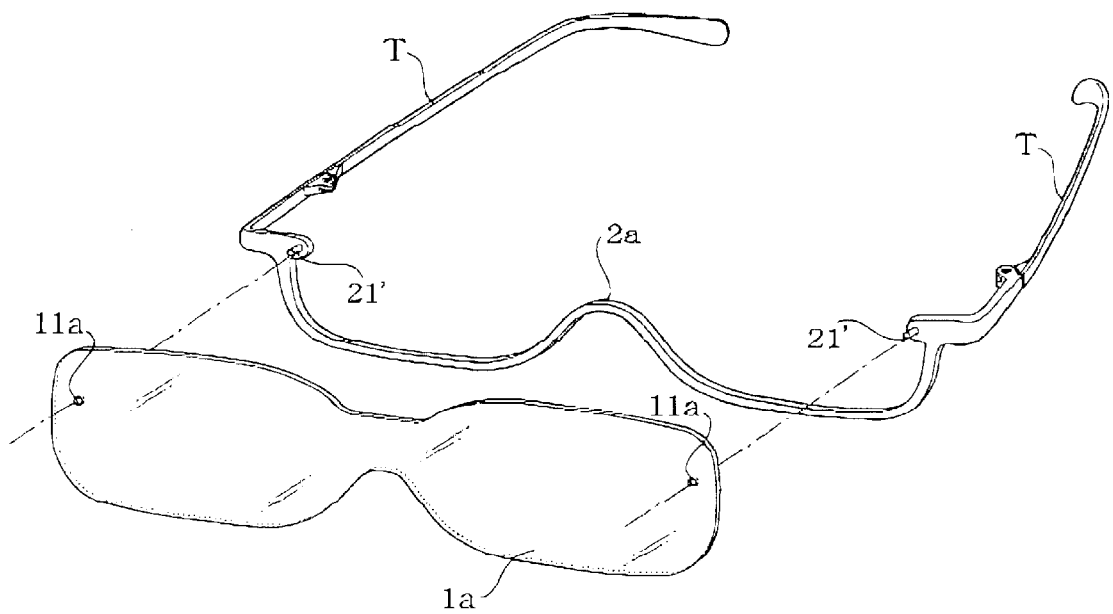

Further, in the above third embodiment, the transversely long rim frame 2*a* is exemplified to support the whole circumference of the rear side of the lens 1*a*, which frame may be formed into a semi-rimmed shape as shown in FIG. 7 to support the upper edge portion and the respective upper side edge portions of the rear side of the lens 1*a* or may be formed into a semi rimmed shape as shown in FIG. 8 to support the lower edge portion and the respective lower side edge portions of the rear side thereof, either of which modifications belong to the technical scope of the present invention.

In the above fourth embodiment and the modified examples thereof, it is only exemplified that the transverse lens 1*a* is mounted to the rim frame 2*a*, but the respective lenses 1 and 1 may be clamped to and supported on the corresponding rims as shown in the above first to third embodiments, in which the projection 21' is provided at the respective side rims to correspond to the clamping hole 11 of the respective lenses 1 and 1.

Further, the projection may be molded into various shapes, provided that such shapes allow the projection to be thrust into the clamping hole and clamped thereto. For instance, the stopper of the projection may be formed into a ring shape to enclose the whole outer circumference of the clamping hole opened to the frontal side of the lens. Any of such modifications belong to the technical scope of the present invention.

As described above, the flexibility of either the respective lenses or the front bar as well as the clamping of the projections to the holes of the respective lenses allow the lenses to be held in position in an easy manner, which leads to a labor-saving production of the spectacles, but also to the cost reduction thereof.

Further, the clamping mechanism of spectacle lens according to the present invention is smart and shapely in design so that its industrial applicability is very high.

What is claimed is:

1. Clamping mechanism of spectacle lens having a front (F) comprises a pair of lenses (1) and (1) and a front bar (2) that supports said lenses (1) and (1) in front of respective eyes, consisting of two clamping holes (11) and (11) which are provided to an upper portion of each of the respective lenses (1) and (1) and consisting of two projections (21) and (21) which are provided to said front bar (2) to support each said two lenses (1) and (1) in front of the respective eyes, and said front (F) is arranged by poking the two projections (21) and (21) provided at respective sides of the front bar (2) through the two clamping holes (11) and (11) of each of the respective lenses (1) and (1).

2. Clamping mechanism of spectacle lens according to claim 1 wherein a relative difference in curvature between the respective lenses (1) and (1) and the front bar (2) allows an upper edge portion of the respective lenses (1) and (1) to be flexibly clamped to the front bar (1) in accordance with a curving surface of said bar (2).

3. Clamping mechanism of spectacle lens according to claim 2 wherein attachment holes (22) are bored through the front bar (2), into which holes fixing elements (23) are fitted so as to form the projections (21).

4. Clamping mechanism of spectacle lens according to claim 2 wherein a head portion of the respective projections (21) of the front bar (2) is covered with a synthetic resin coat (21a).

5. Clamping mechanism of spectacle lens according to claim 2 wherein the head portion of the respective projections (21) of the front bar (2) is provided with a stopper (21b).

6. Clamping mechanism of spectacle lens according to claim 1 wherein attachment holes (22) are bored through the front bar (2), into which holes fixing elements (23) are fitted so as to form the projections (21).

7. Clamping mechanism of spectacle lens according to claim 6 wherein a head portion of the respective projections (21) of the front bar (2) is covered with a synthetic resin coat (21a).

8. Clamping mechanism of spectacle lens according to claim 6 wherein the head portion of the respective projections (21) of the front bar (2) is provided with a stopper (21b).

9. Clamping mechanism of spectacle lens according to claim 1 wherein a head portion of the respective projections (21) of the front bar (2) is covered with a synthetic resin coat (21a).

10. Clamping mechanism of spectacle lens according to claim 9 wherein the head portion of the respective projections (21) of the front bar (2) is provided with a stopper (21b).

11. Clamping mechanism of spectacle lens according to claim 1 wherein the head portion of the respective projections (21) of the front bar (2) is provided with a stopper (21b).

12. Clamping mechanism of spectacle lens having a front (F) consisting of a single lens (1a) wide enough to cover respective eyes and a rim frame (2a) to support a rear side of said lens (1a), wherein the lens (1a) consists of two clamping holes which are provided in a vicinity of respective sides of said lens (1a) and said rim frame consists of two projections (21') and (21') are provided to said rim frame (2a) to correspond to said clamping holes (11a) and (11a), said front (F) is arranged by poking said two projections (21') and (21') through said two clamping holes (11a) and (11a).

13. Clamping mechanism of spectacle lens according to claim 12 wherein said rim frame (2a) is molded into a rimmed shape to support a whole circumference of the rear side of said lens (1a).

14. Clamping mechanism of spectacle lens according to claim 12 wherein said rim frame (2a) is molded into a semi-rimmed shape to support an upper edge portion and respective upper side edge portions of the rear side of said lens (1a).

15. Clamping mechanism of spectacle lens according to claim 12 wherein said rim frame (2a) is molded into a semi-rimmed shape to support a lower edge portion and respective lower side edge portions of the rear side of said lens (1a).

16. Clamping mechanism of spectacle lens according to claim 12 wherein said rim frame (2a) is made from metallic material.

17. Clamping mechanism of spectacle lens according to claim 12 wherein said rim (2a) is made from synthetic resin.

* * * * *